July 14, 1925.  
S. MILLS ET AL  
SPEED AND DIRECTION INDICATOR FOR SHAFTS  
Filed Dec. 18, 1922  2 Sheets-Sheet 1

1,546,097

INVENTORS  
SAMUEL MILLS  
THOMAS G. PLANT  
BY  
ATTORNEY

July 14, 1925.
S. MILLS ET AL
1,546,097
SPEED AND DIRECTION INDICATOR FOR SHAFTS
Filed Dec. 18, 1922  2 Sheets-Sheet 2
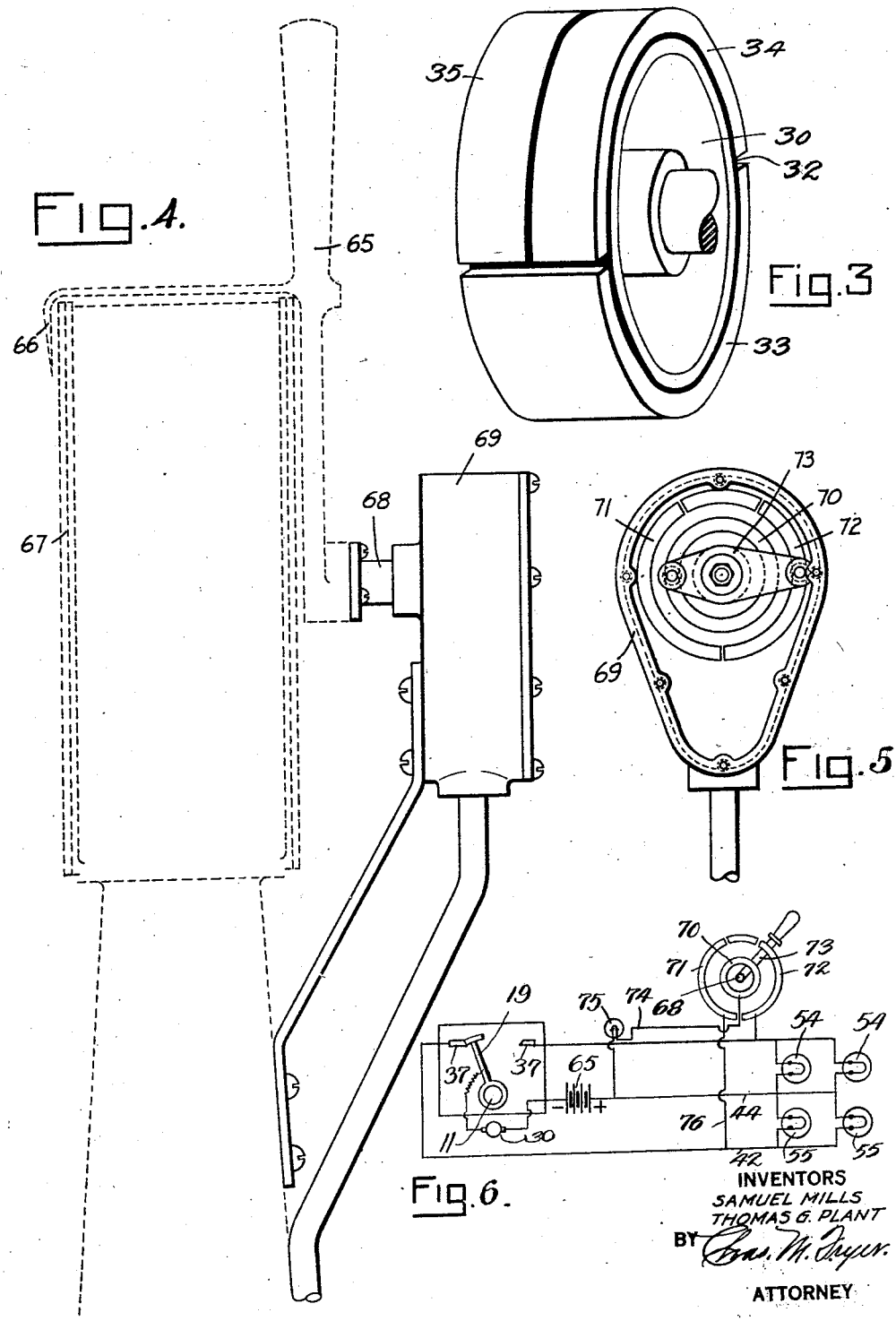
INVENTORS
SAMUEL MILLS
THOMAS G. PLANT
BY
ATTORNEY Patented July 14, 1925.

1,546,097

UNITED STATES PATENT OFFICE.

SAMUEL MILLS, OF OAKLAND, AND THOMAS G. PLANT, OF SAUSALITO, CALIFORNIA.

SPEED AND DIRECTION INDICATOR FOR SHAFTS.

Application filed December 18, 1922. Serial No. 607,587.

*To all whom it may concern:*

Be it known that we, SAMUEL MILLS and THOMAS G. PLANT, citizens of the United States, and residents, respectively, of the city of Oakland, in the county of Alameda, and the town of Sausalito, in the county of Marin, and State of California, have invented a new and useful Improvement in Speed and Direction Indicators for Shafts, of which the following is a specification.

This invention relates to devices for indicating the rate and direction of rotation of rotating parts of machinery, and relates more particularly to the type of indicating mechanism described and illustrated in our co-pending application filed March 31, 1922, Serial No. 457,234. The principal object of the present invention is to provide efficient and reliable mechanism, not only to indicate the rate and direction of rotation of a shaft, but also to indicate the failure of the shaft to rotate in the direction called for by means, such as a ship's telegraph, employed to communicate orders from remote points to the operator in charge of the mechanism in which the rotating shaft is located. Further objects of this invention are to provide compact and simple parts for the indicating mechanism as a whole, and also to provide protecting means to shield the working parts from oil, water, or other foreign matter.

In accomplishing these objects we utilize two electrical indicating circuits having a common leg in which a source of electrical energy is connected in series, each of said circuits including a signal means such as a lamp, and a circuit closing device actuated once for every revolution of the shaft whose operation is to be indicated. We preferably place both circuit closing devices in a single oil and water proof box, located near and directly connected by gear or otherwise to the shaft. Combined with the two signal circuits is a warning signal circuit including a warning signal located near the operator in control of the rotating shaft and circuit closing means actuated by an order transmitting device such as a ship's telegraph, whereby the warning signal is placed in series with and made to operate by one or the other of the signal circuits, whenever the shaft is operated in a direction contrary to that called for by the ship's telegraph or other order transmitting device, thus giving the operator immediate warning of his mistake.

A preferred form of the invention is exemplified in the following description and illustrated in the accompanying drawings in which—

Figure 3 is a perspective view of the commutator drum.

Figure 4 is a side elevation of the warning circuit controlling switch, the ship's telegraph being shown in dotted lines.

Figure 5 is a front elevation of said controlling switch, the cover of the switch casing being removed.

Figure 6 is a diagrammatical view of the electrical circuits employed.

Figure 1:
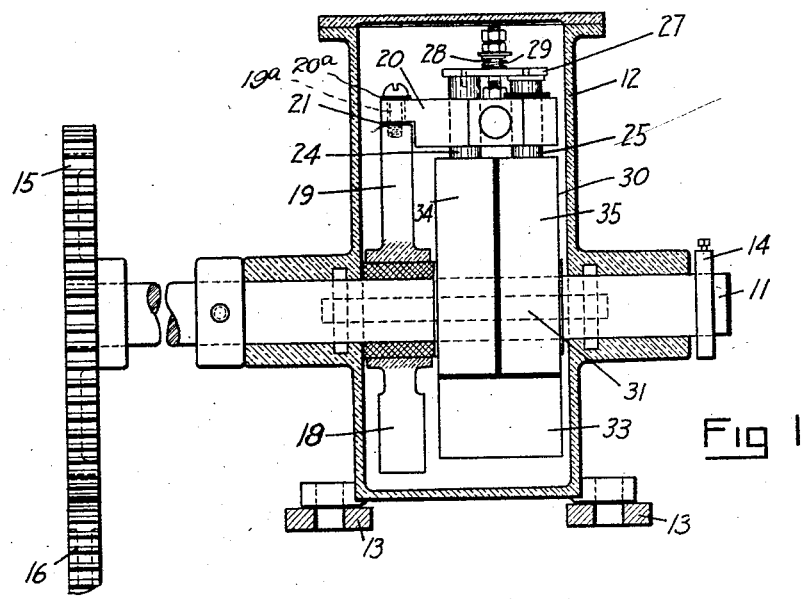
Figure 1 is a side elevation of the circuit closing mechanism, the casing being shown partly in cross-section.

In carrying out the invention, a circuit closing device is located at some suitable place near the shaft, the operation of which is to be indicated. The circuit closing device comprises a shaft, 11, journaled in the sides of an oil and water tight casing 12, provided with grooves $12^a$ for packing about said shaft, and secured to suitable supports 13; said shaft 11 is provided with a collar 14 at one end and a large gear 15 at the other. Said gear 15 meshes a second gear 16 on shaft 17, the operation of which is to be indicated, and the relative proportions of gears 15 and 16 are so arranged that shafts 11 and 17 will have the same rate of rotation. The bearings for shaft 11 in casing 12 are provided with suitable oil grooves $11^a$.

Mounted on shaft 11 within casing 12 is an arm having a counter-balancing portion 18 at one side of its bearing on shaft 11, and an upwardly extending portion 19 on the opposite side of said bearing. A cross piece 20, preferably made of metal or other conducting material is secured to the top of portion 19 by suitable screws $19^a$ insulated from said cross piece by insulation $20^a$, and is separated therefrom by insulation 21. The holes in the cross piece 20 through which screws $19^a$ extend are provided with suitable bushings of insulating material as shown at $19^b$.

Figure 2:
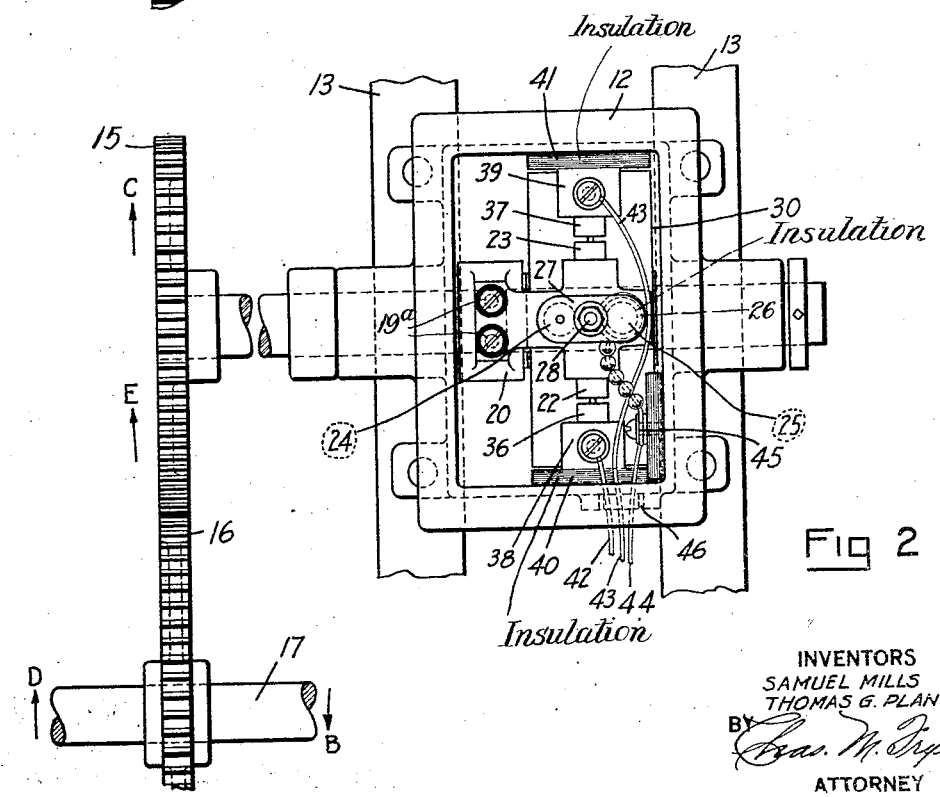
Figure 2 is a plan of the circuit closing mechanism.

As shown in Figures 1 and 2, cross piece 20 is fitted with carbon contacts 22 and 23, one on either side of said arm 20, each of said contacts being in electrical connection with arm 20. Said arm 20 is also fitted with carbon contacts 24 and 25, extending vertically through said arm 20. Carbon 25 is insulated from arm 20 by insulation 26, while carbon 24 is not so insulated and is in electrical connection with said arm 20. Carbons 24 and 25 are fitted with a yoke 27, which is made to exert a downward pressure on said contacts by tension screw 28, which compresses spring 29 between said yoke 27 and a nut on said screw 28. The downward pressure of yoke 27 on contacts 24 and 25 brings their lower ends firmly into contact with the surface of a commutator drum 30, carried by shaft 11 immediately beneath arm 20. Said drum is held firmly to shaft 11 by suitable means such as a key fitted into key-way 31 in shaft 11 and rotates with said shafting. The outer surface of drum 30 is made of some suitable conducting material, such as brass or bronze, and is separated from the central portion of the drum by a circular band of insulation 32. Said outer portion of drum 30 is divided into three parts, consisting of a semi-circular band 33, being equal in width with drum 30, and extending slightly less than half way around said drum 30, and two semi-circular bands 34 and 35, each slightly less than half the width of drum 30, extending around the half of said drum not covered by band 33. Bands 33, 34 and 35 are each separated from the other by sufficient space to form an insulation and all of them are separated from the central portion of the drum by the band of insulation 32.

Within casing 12 two carbon contacts 36 and 37 arranged to engage contacts 22 and 23, respectively, are secured to the sides of casing 12 by blocks of conducting material 38 and 39, into which said carbons fit said blocks 38 and 39 being separated from casing 12 by insulating material as shown at 40 and 41 in Figure 2. Each of the blocks 38 and 39 are provided with terminal screws, by which leads 42 and 43 are connected to contacts 36 and 37, respectively. These leads, together with lead 44, form two signal circuits, of which lead 44 is the common leg, said lead 44 being connected with carbon contact 25. For convenience lead 44 is fitted with a flexible portion where it connects with carbon 25, this flexible portion being protected by insulating beads 44ª, and being connected to the main lead 44 through terminal block 45. Suitable conduit connection 46 is provided to receive a conduit to carry leads 42, 43 and 44 from casing 12 to a suitable signal box.

Signal lamps 54 are connected in a circuit comprising lead 44 in which a source of electrical energy 65 is connected in series and lead 43, which is connected to carbon contact 37 in casing 12. Signal lamps 55 are in a circuit comprising said lead 44 and lead 42 connected to carbon contact 36 in casing 12. Thus it will be observed that when shaft 17 rotates in the direction of arrow B (Figure 2) shaft 11 rotates in the direction of arrow C. Arm 20, due to friction in its bearing on shaft 11 and the friction of carbons 24 and 25 on drum 30, will then move in a manner to bring carbon contacts 23 and 37 into connection with each other and will remain in this position as long as shaft 11 rotates in the direction of arrow C, and with each revolution of drum 30 the signal circuit in which lamps 54 are located will be closed momentarily, thus causing said lamps to flash once with every revolution of shaft 17 in the direction of arrow B.

Counterbalance 18 is so arranged that when shaft 11 is at rest the weight of said counterbalance is just sufficient to overcome the friction of brushes 24 and 25 on the commutator drum and to bring arm 20 back to normal vertical position with none of the carbons in contact. The weight of the counterbalance 18, however, is so adjusted that the added friction caused by rotation of shaft 11 and drum 31 produces operation of arm 20 as described above.

The momentary closing of said circuit for each revolution of shaft 17 is produced by drum 30, which only permits current to flow from lead 43 through contacts 37 and 23, and arm 20 to carbon 25 and lead 44 when segment 31 is under carbons 24 and 25, thus establishing a connection between said carbons. During the half of the revolution of drum 30 in which carbons 24 and 25 rest on segments 34 and 35, respectively, no current can flow from carbon 24 to carbon 25, and the circuit therefore remains open. A similar but reverse operation results when shaft 17 rotates in the direction of arrow D, causing shaft 11 to rotate in the direction of arrow E, lamps 55 in that case flashing once for every revolution of shaft 17 in the direction of said arrow D. In this manner the exact speed and direction of rotation of shaft 17 can be indicated at any remote point.

In situations where means such as a ship's telegraph are used to transmit orders from remote points to the engine room, we employ an additional circuit and signal and controlling means, whereby the engineer is immediately warned if he operates the shaft 17 in a direction contrary to that called for by the ship's telegraph. The usual ship's telegraph comprises a handle 65, carrying a pointer 66, arranged to indicate various positions such as "Ahead" and "Astern" on a dial shown in side elevation only at 67, Figure 4. According to our present invention the shaft about which handle 65 rotates is extended as at 68 and made to project into a casing 69 in which are arranged a circular contact 70, concentric with the end of said shaft 68 and two semi-circular contacts 71 and 72, concentric with said contact 70, but insulated therefrom. The end of shaft 68 is fitted with an arm 73 (indicated diagrammatically merely in Figure 6) one end of which engages contact 70 and the other end of which engages contact 71 or 72, according to the position of shaft 68. Contact 70 is connected by lead 74 (Figure 11) with the common leg 44 of the two signal circuits, and a warning device such as a bell or lamp 75 is connected in series with lead 74 and located near the engineer. Contact 71 is connected by lead 76 to lead 42 of the signal circuit in which lamps 55 are located and contact 72 is connected by lead 77 to lead 43 of the signal circuit in which lamps 54 are located.

When it is desired to transmit to the engineer a command to operate shaft 17 in the direction of arrow D, handle 65 of the telegraph is rotated in a manner to bring pointer 66 to the position on dial 67 corresponding to said command. This movement of handle 65 rotates shaft 68 in a manner to cause arm 73 to connect contacts 70 and 72. If the engineer does then correctly operate shaft 17 in the direction of arrow D, the circuit in which lamps 55 are located will be closed, as previously explained, but warning signal 75 will not operate because not connected across said circuit in which lamps 55 are located, and which is being intermittently closed by the rotation of drum 30. If, however, the engineer by mistake operates shaft 17 in the direction of arrow B, when the telegraph is in the position just described, that is, calling for operation in the direction of arrow D, then warning signal 75 is made to operate because connected by means of contacts 70 and 72 and arm 73 across the circuit in which lamps 54 are located, which circuit, as previously explained, is the one in operation when shaft 17 rotates in the direction of arrow B. The engineer, therefore, is immediately warned of any error in carrying out the commands transmitted to him by the ship's telegraph.

Having thus described our invention what we claim as new, and desire to secure as Letters Patent is:—

1. Means to indicate the operation of a rotary shaft comprising signals operable by electricity to indicate each direction of rotation of said shaft, electric circuits for said signals, terminals for the legs of said circuits, a commutator rotatable in synchronism with said shaft, a brush holder for said commutator movable concentrically therewith, contacts on said brush holder alternately engageable with terminals of each of said circuits in accordance with the direction of rotation of said shaft, contacts on said brush holder engageable with said commutator, a segment on said commutator engageable with said last named contacts to form an electrical connection between them, and segments insulated from each other on said commutator engageable with said same contacts to prevent an electrical connection between said contacts.

2. Means to indicate the operation of a rotary shaft comprising signals operable by electricity to indicate each direction of rotation of said shaft, electric circuits for said signals, terminals for the legs of said circuits, a commutator mounted on a shaft for rotation therewith, a brush holder for said commutator journalled on said commutator shaft adjacent said commutator, contacts on said brush holder alternately engageable with terminals of each of said circuits in accordance with the direction of rotation of said shaft, contacts on said brush holder engageable with said commutator, a segment on said commutator engageable with said last named contacts to form an electrical connection between them, and segments insulated from each other on said commutator engageable with said same contacts to prevent an electrical connection between said contacts.

3. The combination with a device as described in claim (1), of order transmitting mechanism, warning signal mechanism, and means whereby rotation of said shaft in a direction contrary to that called for by said order transmitting mechanism automatically actuates said warning signal mechanism.

4. The combination with a device as described in claim (1), of order transmitting mechanism, electrical warning signal mechanism, and means whereby rotation of said shaft in a direction contrary to that called for by said order transmitting mechanism automatically actuates said warning signal mechanism, said means comprising mechanism to connect said electrical warning signal mechanism in series with the speed and direction signal circuit through which current is flowing.

5. The combination with a device as described in claim (1) of order transmitting mechanism, electrical warning signal mechanism and means whereby rotation of said shaft in a direction contrary to that called for by said order transmitting mechanism automatically actuates said warning signal mechanism, said means comprising means to connect said warning in series with the speed and direction signal circuit through which current is flowing, said last named means comprising a circuit closer actuated by said order transmitting mechanism.

6. The combination with a device as described in claim (2), of order transmitting mechanism, warning signal mechanism, and means whereby rotation of said shaft in a direction contrary to that called for by said order transmitting mechanism automatically actuates said warning signal mechanism.

7. The combination with a device as described in claim (2), of order transmitting mechanism, electrical warning signal mechanism, and means whereby rotation of said shaft in a direction contrary to that called for by said order transmitting mechanism automatically actuates said warning signal mechanism, said means comprising mechanism to connect said electrical warning signal mechanism in series with the speed and direction signal circuit through which current is flowing.

8. The combination with a device as described in claim (2) of order transmitting mechanism, electrical warning signal mechanism and means whereby rotation of said shaft in a direction contrary to that called for by said order transmitting mechanism automatically actuates said warning signal mechanism, said means comprising means to connect said warning in series with the speed and direction signal circuit through which current is flowing, said last named means comprising a circuit closer actuated by said order transmitting mechanism.

SAMUEL MILLS.
THOMAS G. PLANT.